US007020197B2

(12) United States Patent
Tanase et al.

(10) Patent No.: US 7,020,197 B2
(45) Date of Patent: Mar. 28, 2006

(54) TELECINE CONVERTING METHOD

(75) Inventors: Susumu Tanase, Kadoma (JP); Toshiya Iinuma, Kadoma (JP); Syugo Yamashita, Hirakata (JP); Haruhiko Murata, Ibaraki (JP)

(73) Assignee: Sanyo Electric Co., Ltd., Osaka (JP)

( * ) Notice: Subject to any disclaimer, the term of this patent is extended or adjusted under 35 U.S.C. 154(b) by 470 days.

(21) Appl. No.: 10/195,559

(22) Filed: Jul. 16, 2002

(65) Prior Publication Data

US 2004/0012673 A1 Jan. 22, 2004

(51) Int. Cl.
*H04N 7/18* (2006.01)

(52) U.S. Cl. ............................ 375/240.12; 375/240.25

(58) Field of Classification Search ....................... 375/240.12–240.26; 348/96–110, 699–702
See application file for complete search history.

(56) References Cited

U.S. PATENT DOCUMENTS 5,428,399 A * 6/1995 Robinson et al. ........... 348/459
5,510,902 A * 4/1996 Fujinami et al. ............ 386/123
5,847,772 A * 12/1998 Wells ......................... 348/571
6,407,775 B1 * 6/2002 Frink et al. ................. 348/443
6,563,550 B1 * 5/2003 Kahn et al. ................. 348/700

FOREIGN PATENT DOCUMENTS

JP 01-291581 11/1989
JP 04-323988 11/1992
JP 06-189190 7/1994
JP 07-123291 5/1995
JP 09-172618 6/1997

* cited by examiner

*Primary Examiner*—Andy Rao
(74) *Attorney, Agent, or Firm*—Rader, Fishman & Grauer PLLC

(57) ABSTRACT

In a telecine converting method for converting a video in a movie film composed of 24 frames per second into a video signal composed of 60 frames per second, a telecine converting method is characterized in that in order that respective integration values of display time periods of frame videos in the movie film become equal after the telecine conversion, used as a video in the predetermined frame after the conversion is an interpolated video obtained by interpolating the frame videos ahead of and behind the video in the movie film.

9 Claims, 21 Drawing Sheets

FIG. 3

| MOVIE FILM (24P) | A | B | C | D | E | F |
|---|---|---|---|---|---|---|

| | | | | | | | | | | | | | | | |
|---|---|---|---|---|---|---|---|---|---|---|---|---|---|---|---|
| 2-3 PULL-DOWN (CONVENTIONAL) | | A | A | B | B | B | C | C | D | D | D | E | E | F | |
| TELECINE PERIOD NUMBER | 0 | 1 | 2 | 3 | 4 | 0 | 1 | 2 | 3 | 4 | 0 | 1 | 2 | 3 | 4 |
| F MEMORY A | | | A | A | A | A | A | A | A | D | D | D | D | D | D |
| F MEMORY B | | | | | B | B | B | B | B | B | B | B | E | E | E |
| F MEMORY C | | | | | | | | C | C | C | C | C | C | C | F |
| SEL0 | | | | | A | A | A | B | B | C | C | C | D | D | E |
| SEL1 | | | | A | B | B | B | C | C | D | D | D | E | E | F |
| FIRST METHOD p | | | | 0 | 0.75 | 0 | 0 | 0.25 | 0 | 0.75 | 0 | 0 | 0.25 | 0 | 0.75 |
| FIRST METHOD q | | | | 1 | 0.25 | 1 | 1 | 0.75 | 1 | 0.25 | 1 | 1 | 0.75 | 1 | 0.25 |
| FIRST METHOD OUTPUT | | | | A | pA+qB | B | B | pB+qC | C | pC+qD | D | D | pD+qE | E | pE+qF |
| SECOND METHOD p | | | | | 1 | 0.5 | 0 | 0.75 | 0.25 | 1 | 0.5 | 0 | 0.75 | 0.25 | 1 |
| SECOND METHOD q | | | | | 0 | 0.5 | 1 | 0.25 | 0.75 | 0 | 0.5 | 1 | 0.25 | 0.75 | 0 |
| SECOND METHOD OUTPUT | | | | | A | pA+qB | B | pB+qC | pB+qC | C | pC+qD | D | pD+qE | pD+qE | E |
| THIRD METHOD p | | | | | 1 | 0.5 | 0.25 | 0.75 | 0.5 | 1 | 0.5 | 0.25 | 0.75 | 0.5 | 1 |
| THIRD METHOD q | | | | | 0 | 0.5 | 0.75 | 0.25 | 0.5 | 0 | 0.5 | 0.75 | 0.25 | 0.5 | 0 |
| THIRD METHOD OUTPUT | | | | | A | pA+qB | pA+qB | pB+qC | pB+qC | C | pC+qD | pC+qD | pD+qE | pD+qE | E |

| | | |
|---|---|---|
| 0 | -1 | 0 |
| -1 | 4 | -1 |
| 0 | -1 | 0 |

FIG. 13

| REGION INTERPOLATION VALUE RK | TELECINE PERIOD NUMBER | | | | |
|---|---|---|---|---|---|
| | 0 | 1 | 2 | 3 | 4 |
| 0.5000 | 0 | 0 | 0.5 | 0 | 1 |
| 0.3750 | 0 | 0 | 0.375 | 0 | 1 |
| 0.2500 | 0 | 0 | 0.25 | 0 | 1 |
| 0.1250 | 0 | 0 | 0.125 | 0 | 1 |
| 0.0000 | 0 | 0 | 0 | 0 | 1 |

FIG. 14

| REGION INTERPOLATION VALUE RK | TELECINE PERIOD NUMBER | | | | |
|---|---|---|---|---|---|
| | 0 | 1 | 2 | 3 | 4 |
| 0.5000 | 0.25 | 0 | 0.5 | 0 | 0.75 |
| 0.4375 | 0.1875 | 0 | 0.5 | 0 | 0.8175 |
| 0.3750 | 0.125 | 0 | 0.375 | 0 | 0.875 |
| 0.3125 | 0.0675 | 0 | 0.375 | 0 | 0.9375 |
| 0.2500 | 0 | 0 | 0.5 | 0 | 1 |
| 0.1875 | 0 | 0 | 0.375 | 0 | 1 |
| 0.1250 | 0 | 0 | 0.25 | 0 | 1 |
| 0.0625 | 0 | 0 | 0.125 | 0 | 1 |
| 0.0000 | 0 | 0 | 0 | 0 | 1 |

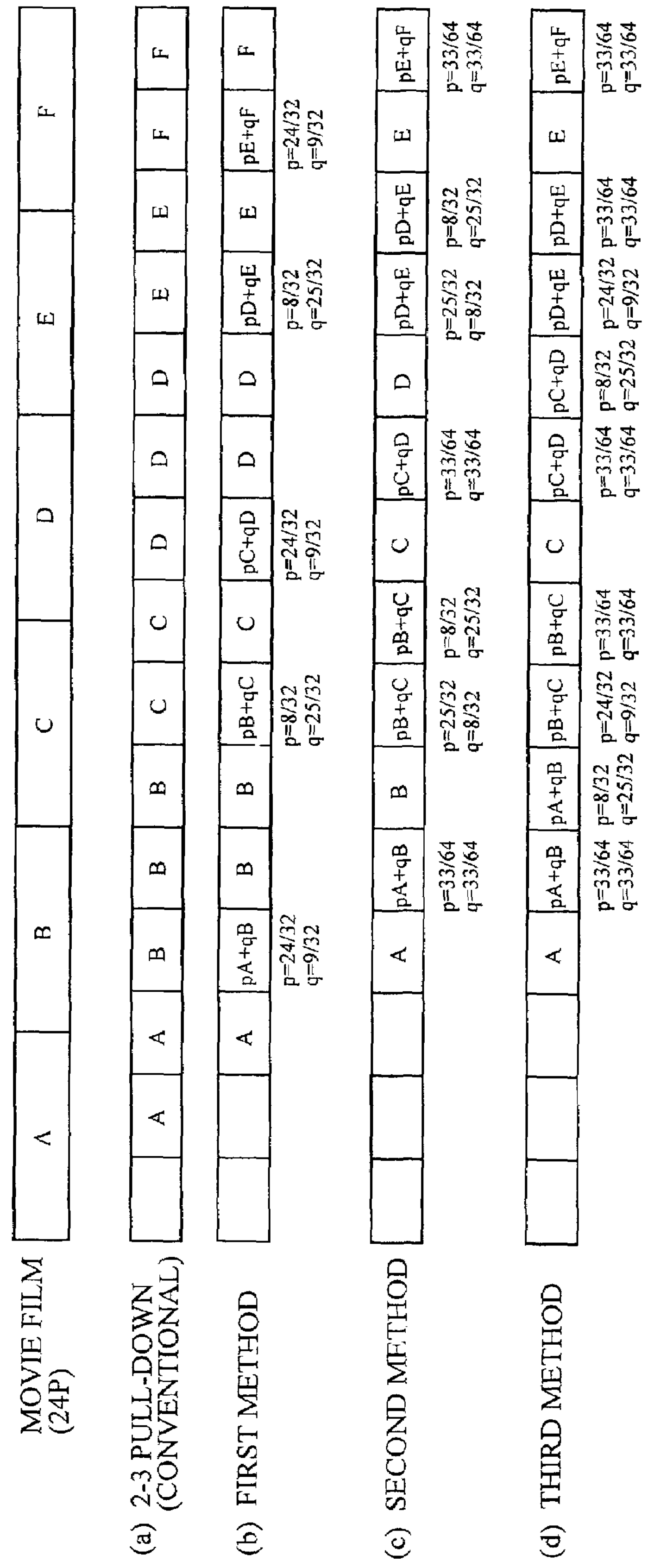

FIG. 18

(a) 2-3 PULL-DOWN (CONVENTIONAL)

| MOVIE FILM (24P) | A | B | C | D | E | F |

| A | A | B | B | C | D | D | E | E | F |

(b) FIRST METHOD

| A | pA+qB | B | pB+qC | C | pC+qD | D | pD+qE | E | pE+qF | F |
| | p=24/32 q=9/32 | | p=8/32 q=25/32 | | p=24/32 q=9/32 | | p=8/32 q=25/32 | | p=24/32 q=9/32 | |

(c) SECOND METHOD

| A | pA+qB | B | pB+qC | C | pC+qD | D | pD+qE | E | pE+qF |
| | p=33/64 q=33/64 | | p=25/32 q=8/32 | | p=33/64 q=33/64 | | p=25/32 q=8/32 | | p=33/64 q=33/64 |

(d) THIRD METHOD

| A | pA+qB | pA+qB | pB+qC | pB+qC | pC+qD | pC+qD | pD+qE | pD+qE | pE+qF |
| | p=33/64 q=33/64 | p=8/32 q=25/32 | p=24/32 q=9/32 | p=33/64 q=33/64 | p=33/64 q=33/64 | p=8/32 q=25/32 | p=24/32 q=9/32 | p=33/64 q=33/64 | p=33/64 q=33/64 |

FIG. 20

| | | | | | | | | | | | | | | | |
|---|---|---|---|---|---|---|---|---|---|---|---|---|---|---|---|
| MOVIE FILM (24P) | | A | | B | | C | | | D | | | E | | F | |
| 2-3 PULL-DOWN (CONVENTIONAL) | | A | A | B | B | B | C | C | D | D | D | E | E | F | |
| TELECINE PERIOD NUMBER | 0 | 1 | 2 | 3 | 4 | 0 | 1 | 2 | 3 | 4 | 0 | 1 | 2 | 3 | 4 |
| F MEMORY A | | | A | A | A | A | A | A | A | D | D | D | D | D | D |
| F MEMORY B | | | | | B | B | B | B | B | B | B | B | E | E | E |
| F MEMORY C | | | | | | | | C | C | C | C | C | C | C | F |
| SEL0 | | | | | A | A | A | B | B | C | C | C | D | D | E |
| SEL1 | | | | A | B | B | B | C | C | D | D | D | E | E | F |
| FIRST METHOD p | | | | 0 | 24/32 | 0 | 0 | 8/32 | 0 | 24/32 | 0 | 0 | 8/32 | 0 | 24/32 |
| FIRST METHOD q | | | | 1 | 9/32 | 1 | 1 | 25/32 | 1 | 9/32 | 1 | 1 | 25/32 | 1 | 9/32 |
| FIRST METHOD OUTPUT OF ADDER | | | | A | pA+qB | B | B | pB+qC | C | pC+qD | D | D | pD+qE | E | pE+qF |
| SECOND METHOD p | | | | | 1 | 33/64 | 0 | 25/32 | 8/32 | 1 | 33/64 | 0 | 25/32 | 8/32 | 1 |
| SECOND METHOD q | | | | | 0 | 33/64 | 1 | 8/32 | 25/32 | 0 | 33/64 | 1 | 8/32 | 25/32 | 0 |
| SECOND METHOD OUTPUT OF ADDER | | | | | A | pA+qB | B | pB+qC | pB+qC | C | pC+qD | D | pD+qE | pD+qE | E |
| THIRD METHOD p | | | | | 1 | 33/64 | 8/32 | 24/32 | 33/64 | 1 | 33/64 | 8/32 | 24/32 | 33/64 | 1 |
| THIRD METHOD q | | | | | 0 | 33/64 | 25/32 | 9/32 | 33/64 | 0 | 33/64 | 25/32 | 9/32 | 33/64 | 0 |
| THIRD METHOD OUTPUT OF ADDER | | | | | A | pA+qB | pA+qB | pB+qC | pB+qC | C | pC+qD | pC+qD | pD+qE | pD+qE | E |

FIG. 22a

| TELECINE PERIOD NUMBER | | | | |
|---|---|---|---|---|
| 0 | 1 | 2 | 3 | 4 |
| p=0<br>q=1 | p=0<br>q=1 | p=0.25<br>q=0.75 | p=0<br>q=1 | p=0.75<br>q=0.25 |

FIG. 22b

| TELECINE PERIOD NUMBER | | | | |
|---|---|---|---|---|
| 0 | 1 | 2 | 3 | 4 |
| p=0<br>q=1 | p=0<br>q=1 | p=8/32<br>q=25/32 | p=0<br>q=1 | p=24/32<br>q=9/32 |

TELECINE CONVERTING METHOD

BACKGROUND OF THE INVENTION

1. Field of the Invention

The present invention relates to a telecine converting method for converting a video in a movie film composed of 24 frames per second into a video signal composed of 60 frames per second.

2. Description of the Prior Art

Employed as conventional telecine conversion for converting a movie film composed of 24 frames per second (24P) into a progressive video signal composed of 60 frames per second (60P) is a 2-3 pull-down system in which one frame is alternately assigned to two frames and three frames, as shown in FIG. 1(*a*).

In the 2-3 pull-down system, a state where a video stands still for two frames occurs in a portion where one frame is assigned to two frames, and a state where a video stands still for three frames in a portion where one frame is assigned to three frames. Consequently, "backlash" is produced in the movement of the video, so that the video has an incompatible feeling. Particularly in a video which moves fast, the incompatible feeling becomes significant.

SUMMARY OF THE INVENTION

An object of the present invention is to provide a telecine converting method in which the movement of a video is smoothed.

Still another object of the present invention is to provide a telecine converting method in which the movement of a video is smoothed and the occurrence of flicker can be avoided.

In a telecine converting method for converting a video in a movie film composed of 24 frames per second into a video signal composed of 60 frames per second, a first telecine converting method according to the present invention is characterized in that in order that respective integration values of display time periods of frame videos in the movie film become equal after the telecine conversion, used as a video in the predetermined frame after the conversion is an interpolated video obtained by interpolating the frame videos ahead of and behind the video in the movie film.

In a telecine converting method for converting a video in a movie film composed of 24 frames per second into a video signal composed of 60 frames per second, which is so adapted as to use as a video in the predetermined frame after the telecine conversion an interpolated video obtained by interpolating frame videos ahead of and behind the video in the movie film, a second telecine converting method according to the present invention is characterized by dividing one screen into a plurality of blocks, calculating, for each of the blocks, information related to the movement of the block, determining, when the interpolated video is produced, an interpolation factor for each of the blocks on the basis of the information related to the movement of the block, and producing the interpolated video for each of the blocks on the basis of the determined interpolation factor for the block.

It is preferable to calculate an interpolation factor for each pixel on the basis of the interpolation factor determined for each block, and produce, on the basis of the calculated interpolation factor for each pixel, an interpolated video for the pixel.

In a telecine converting method for converting a video in a movie film composed of 24 frames per second into a video signal composed of 60 frames per second, which is so adapted as to use as a video in the predetermined frame after the telecine conversion an interpolated video obtained by interpolating frame videos ahead of and behind the video in the movie film, a third telecine converting method according to the present invention is characterized by using, as interpolation factors by which the frame videos ahead of and behind the predetermined frame video are respectively multiplied, interpolation factors the sum of which is larger than one, and correcting, when an obtained interpolation value for each pixel exceeds the larger one of the luminance values of the two original frame videos used for calculating the interpolation value, the interpolation value to be not more than the larger one of the luminance values of the two original frame videos.

In a telecine converting method for converting a video in a movie film composed of 24 frames per second into a video signal composed of 60 frames per second, which is so adapted as to use as a video in the predetermined frame after the telecine conversion an interpolated video obtained by interpolating frame videos ahead of and behind the video in the movie film, a fourth telecine converting method according to the present invention is characterized by preparing, as interpolation factors by which the frame videos ahead of and behind the video in the movie film are respectively multiplied, interpolation factors the sum of which is one and interpolation factors the sum of which is larger than one, producing, when the area of a movement region is not more than a predetermined value, the interpolated video using the interpolation factors the sum of which is one, producing, when the area of the movement region is more than the predetermined value, the interpolated video using the interpolation factors the sum of which is larger than one, and correcting, when in a case where the interpolated video is produced using the interpolation factors the sum of which is larger than one, an obtained interpolation value for each pixel exceeds the larger one of the luminance values of the two original frame videos used for calculating the interpolation value, the interpolation value to be not more than the larger one of the luminance values of the two original frame videos.

In a telecine converting method for converting a video in a movie film composed of 24 frames per second into a video signal composed of 60 frames per second, which is so adapted as to use as a video in the predetermined frame after the telecine conversion an interpolated video obtained by interpolating frame videos ahead of and behind the video in the movie film, a fifth telecine converting method according to the present invention is characterized by preparing, as interpolation factors by which the frame videos ahead of and behind the video in the movie film are respectively multiplied, interpolation factors the sum of which is one and interpolation factors the sum of which is larger than one, producing, when the amount of change in the luminance level of a movement region is not more than a predetermined value, the interpolated video using the interpolation factors the sum of which is one, producing, when the amount of change in the luminance level of the movement region is more than the predetermined value, the interpolated video using the interpolation factors the sum of which is larger than one, and correcting, when in a case where the interpolated video is produced using the interpolation factors the sum of which is larger than one, an obtained interpolation value for each pixel exceeds the larger one of the luminance values of the two original frame videos used for calculating the interpolation value, the interpolation value to be not more than the larger one of the luminance values of the two original frame videos.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a timing chart showing respective signals in units shown in FIG. 2;

FIG. 13 is a schematic view showing an interpolation factor α corresponding to a combination of RK and a telecine period number;

FIG. 14 is a schematic view showing another example of an interpolation factor α corresponding to a combination of RK and a telecine period number;

FIG. 18 is a timing chart showing a conventional 2-3 pull-down system and a telecine converting method according to a third embodiment;

FIG. 20 is a timing chart showing respective signals in units shown in FIG. 19;

FIGS. 22*a* and 22*b* are schematic views respectively showing examples of a first factor table and a second factor table;

DESCRIPTION OF THE PREFERRED EMBODIMENTS

Figure 1:
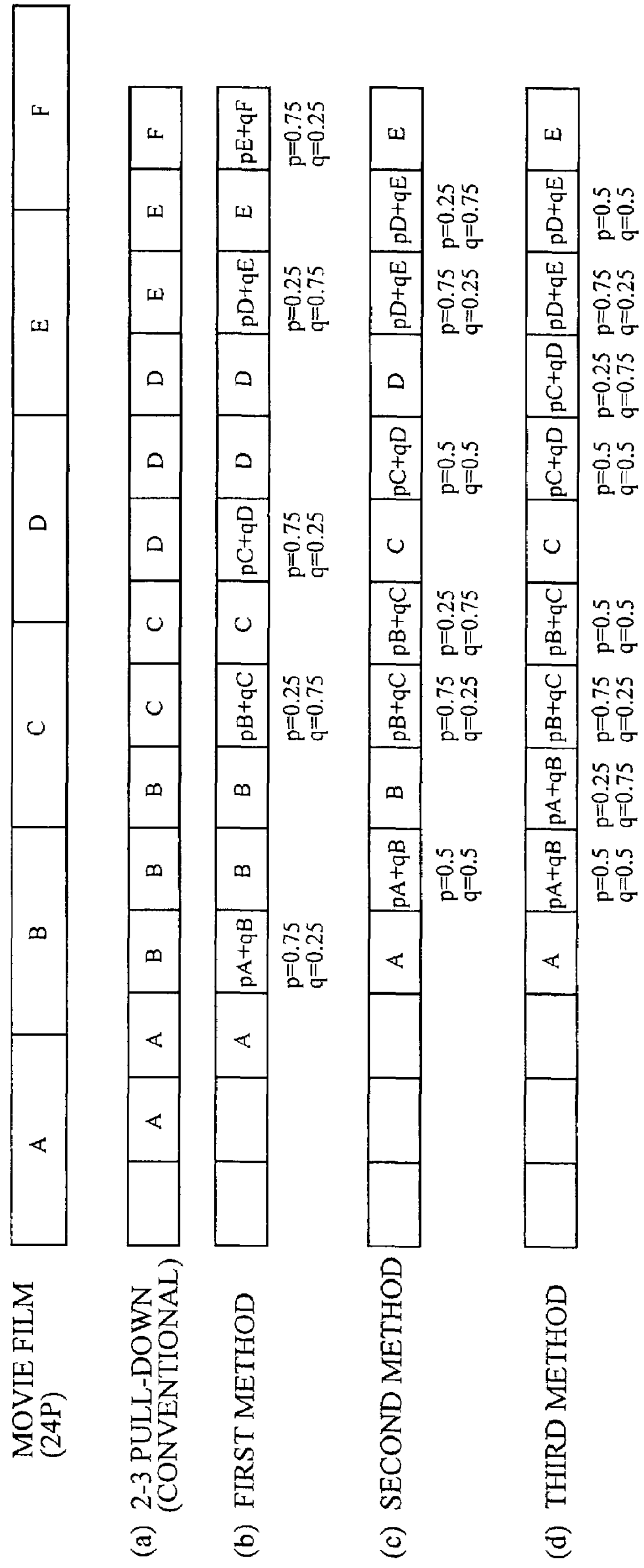
FIG. 1 is a timing chart showing a conventional method (a 2-3 pull-down system) and a telecine converting method according to a first embodiment.

Referring now to the drawings, embodiments of the present invention will be described.

[A] Description of First Embodiment

[1] Description of Telecine Converting Method Description is made of a telecine converting method for converting a movie film composed of 24 frames per second (24P) into a progressive video signal composed of 60 frames per second (60P) using linear interpolation in the whole of a screen.

FIGS. 1(*b*), 1(*c*), and 1(*d*) respectively illustrate three specific telecine converting methods using the linear interpolation in the whole screen.

[1-1] Description of First Method Shown in FIG. 1(*b*)

The first method uses, in a portion where videos are switched, as in switching from a video A to a video B (a video before the switching is taken as $Q_n$, and the subsequent video is taken as $Q_{n+1}$) in a 2-3 pull-down system, not the subsequent video $Q_{n+1}$ as it is but an interpolated video ($pQ_n+qQ_{n+1}$) obtained by interpolating the videos $Q_n$ and $Q_{n+1}$ before and after the switching.

Interpolation factors p and q are determined such that the sum thereof is one and respective integration values of display time periods of frame videos in the movie film become equal. That is, when the same video is continued for two frames and is then switched in the 2-3 pull-down system, as in the switching between the videos A and B in the 2-3 pull-down system, p=0.75 and q=0.25. On the other hand, when the same video is continued for three frames and is then switched in the 2-3 pull-down system, as in switching between videos B and C in the 2-3 pull-down system, p=0.25 and q=0.75.

In the movie film, the respective display time periods of the frame videos are the same. When the movie film is converted into the progressive video signal composed of 60 frames per second, it is difficult to make the respective display time periods of the frame videos equal. Accordingly, the interpolation factors p and q are determined such that respective integration values of the display time periods become equal. Consequently, the display time period of each of the frame videos corresponds to 2.5 frames.

[1-2] Description of Second Method Shown in FIG. 1(*c*)

In the first method shown in FIG. 1(*b*), described above, in the portion where the same video, for example, the video B or D is continued for three frames in the 2-3 pull-down system, the video in the head frame is an interpolated video, and the videos in the two frames subsequent to the head frame are the same video.

Consider a case where the video includes fast movement. In this case, in a portion where the same video is continued for two frames, there occurs a state where the video stands still for two frames, so that "backlash" is produced in the movement of the video.

Therefore, the second method further replaces one of portions where the same video is continued with an interpolated video in addition to replacing a portion where videos are switched with an interpolated video in the 2-3 pull-down system.

Interpolation factors p and q are determined such that the sum thereof is one and respective integration values of display time periods of frame videos in the movie film become equal, as shown in FIG. 1(*c*).

[1-3] Description of Third Method Shown in FIG. 1(*d*)

In the third method, a frame video (A, C, etc.) appears at a rate of once per five frames, videos in all frames between the frame videos are interpolated videos (e.g., pA+qB). Interpolation factors p and q of each of the interpolated videos are determined such that the sum thereof is one and respective integration values of display time periods of frame videos in the movie film become equal, as shown in FIG. 1(*d*).

The above-mentioned first, second, and third methods can be adaptively switched on the basis of movement information and edge information related to an input video (a video in a movie film). For example, the movement of the input video is detected, to use the first method if the movement is small, use the second method if the movement is middle, and use the third method if the movement is large.

[2] Description of Telecine Converter

Figure 2:
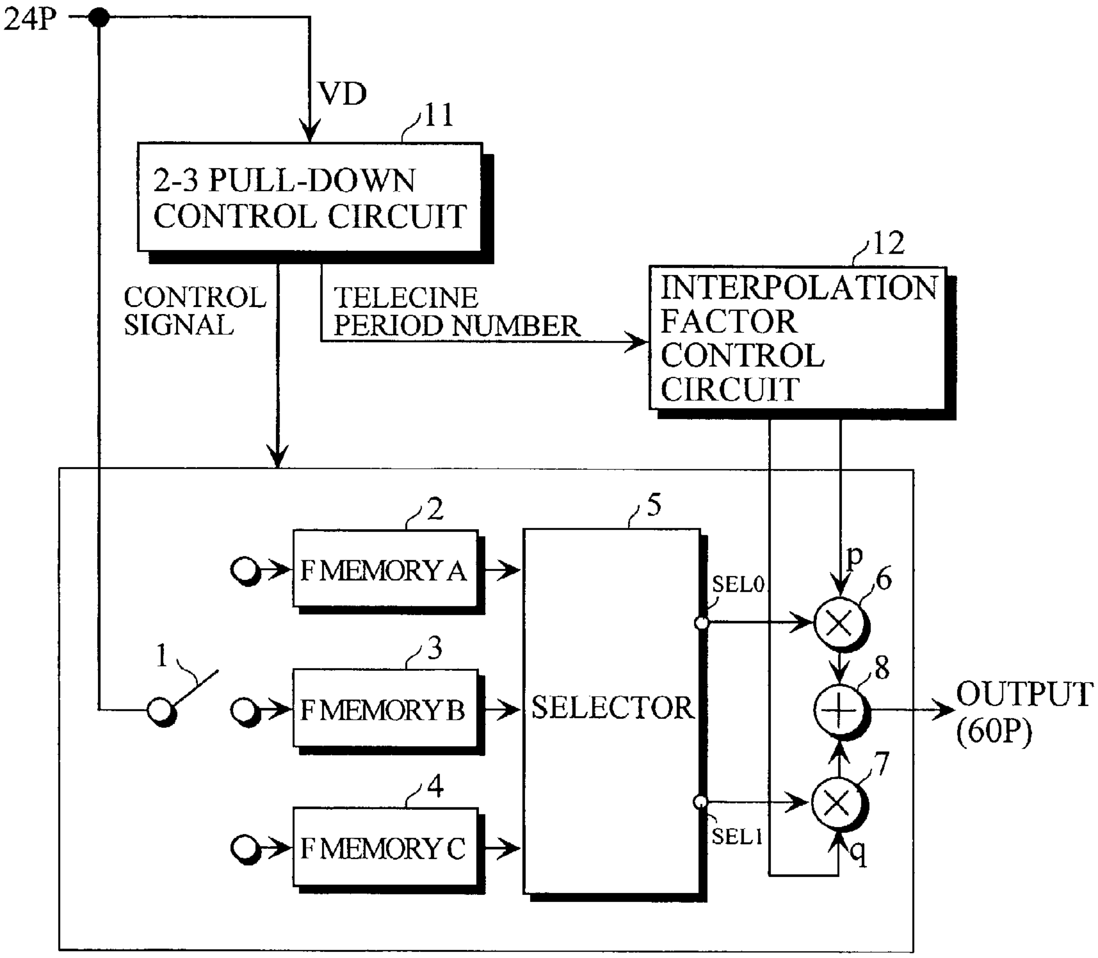
FIG. 2 is a block diagram showing the configuration of a telecine converter for realizing a telecine converting method according to the first embodiment.

FIG. 2 illustrates the configuration of a telecine converter for realizing the above-mentioned first, second or third method.

An input video composed of 24 frames per second (a video in a movie film) is sent to any of frame memories 2, 3, and 4 through a switch 1. A video read out of each of the frame memories 2, 3, and 4 is sent to a selector 5.

Respective video signals read out of the three frame memories are generally inputted to the selector 5, as described later. The selector 5 outputs one video signal from an output terminal (SELO) as a first video signal, while outputting the other video signal from an output terminal (SEL1) as a second video signal.

The first video signal outputted from the output terminal (SELO) of the selector 5 is fed to a first multiplier 6, and the second video signal outputted from the output terminal (SEL1) of the selector 5 is fed to a second multiplier 7. The first multiplier 6 multiplies the first video signal by an interpolation factor p. The second multiplier 7 multiplies the second video signal by an interpolation factor q.

An output of the first multiplier 6 and an output of the second multiplier 7 are added together by an adder 8, and the result of the addition is outputted as a video signal composed of 60 frames per second.

The switch 1, the frame memories 2, 3, and 4, and the selector 5 are controlled by a 2-3 pull-down control circuit 11 to which a vertical synchronizing signal VD in the input video is inputted. The interpolation factors p and q are created by an interpolation factor control circuit 12. The interpolation factor control circuit 12 creates the interpolation factors p and q on the basis of a telecine period number sent from the 2-3 pull-down control circuit 11.

FIG. 3 illustrates respective signals in the units shown in FIG. 2.

In FIG. 3, telecine period numbers are of five types “0” to “4” for each frame, and “0” to “4” are repeated.

The switch 1 is switched so as to cyclically select the three frame memories (the memory A, the memory B, and the memory C) 2, 3, and 4 in synchronization with the timing of switching the input video.

Out of videos stored in the frame memories 2, 3, and 4, the video which is most newly readable and the video which is readable previous to the most newly readable video are read out and are sent to the selector 5. The most newly readable video is outputted as the second video from the terminal (SEL1) of the selector 5. The video which is readable previous to the most newly readable video is outputted as the first video from the terminal (SEL0) of the selector 5.

Interpolation factors are determined in the following manner on the basis of the telecine period number.

| | |
|---|---|
| (1) Case of first method | |
| telecine period number "0" | p = 0, q = 1 |
| telecine period number "1" | p = 0, q = 1 |
| telecine period number "2" | p = 0.25, q = 0.75 |
| telecine period number "3" | p = 0, q = 1 |
| telecine period number "4" | p = 0.75, q = 0.25 |
| (2) Case of second method | |
| telecine period number "0" | p = 0.5, q = 0.5 |
| telecine period number "1" | p = 0, q = 1 |
| telecine period number "2" | p = 0.75, q = 0.25 |
| telecine period number "3" | p = 0.25, q = 0.75 |
| telecine period number "4" | p = 1, q = 0 |
| (3) Case of third method | |
| telecine period number "0" | p = 0.5, q = 0.5 |
| telecine period number "1" | p = 0.25, q = 0.75 |
| telecine period number "2" | p = 0.75, q = 0.25 |
| telecine period number "3" | p = 0.5, q = 0.5 |
| telecine period number "4" | p = 1, q = 0 |

[B] Description of Second Embodiment

[1] Description of Telecine Converting Method

Description is made of a telecine converting method for converting a movie film composed of 24 frames per second (24P) into a progressive video signal composed of 60 frames per second (60P) using linear interpolation for each block in a screen.

In the second embodiment, telecine conversion is made by not the interpolation in the whole of the screen as in the first embodiment but finding interpolation factors for each block in the screen.

That is, the screen is divided into a plurality of blocks, to calculate for each of the blocks an interpolation factor on the basis of information related to the movement of a video in the block. In the present embodiment, the interpolation factors p and q for each pixel are calculated on the basis of the interpolation factor found for each of the blocks. An interpolated video is produced using the calculated interpolation factors p and q for each pixel.

When one screen is divided into a plurality of blocks, the video becomes a video having no incompatible feeling even if the conventional 2-3 pull-down system is used in the block which hardly moves. With respect to the block which moves, however, “backlash” is produced in the movement in the conventional 2-3 pull-down system. The higher the speed of the movement is, the larger the “backlash” of the movement becomes.

In the second embodiment, therefore, with respect to the block which moves, the interpolation factor is calculated on the basis of information related to the movement, and an interpolated video is produced on the basis of the calculated interpolation factor. Further, when interpolation factors in the adjacent blocks differ, the continuity of a subject is broken in the boundary between the blocks. Accordingly, the interpolation factors p and q for each pixel are found on the basis of the interpolation factor found for each of the blocks.

[2] Description of Telecine Converter

Figure 4:
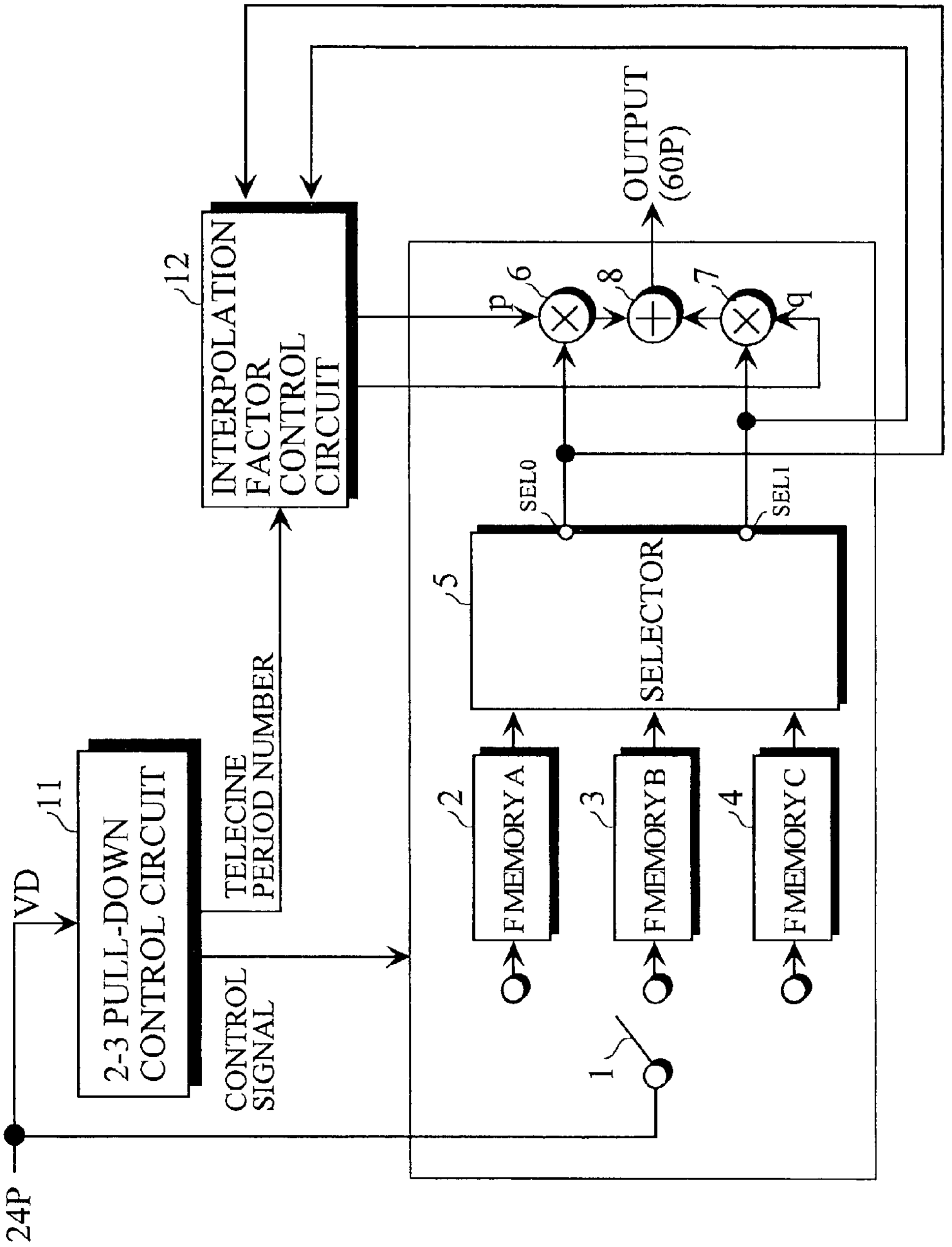
FIG. 4 is a block diagram showing the configuration of a telecine converter for realizing a telecine converting method according to a second embodiment.

FIG. 4 illustrates the configuration of a telecine converter for making telecine conversion using linear interpolation for each block in a screen.

In FIG. 4, units corresponding to those shown in FIG. 2 are assigned the same reference numerals as those shown in FIG. 2.

The telecine converter shown in FIG. 4 differs from the telecine converter shown in FIG. 2 in an interpolation factor control circuit 12. Inputted to the interpolation factor control circuit 12 are a first video signal and a second video signal which are outputted from a selector 5 in addition to a telecine period number from a 2-3 pull-down control circuit.

[3] Description of Interpolation Factor Control Circuit 12

Figure 5:
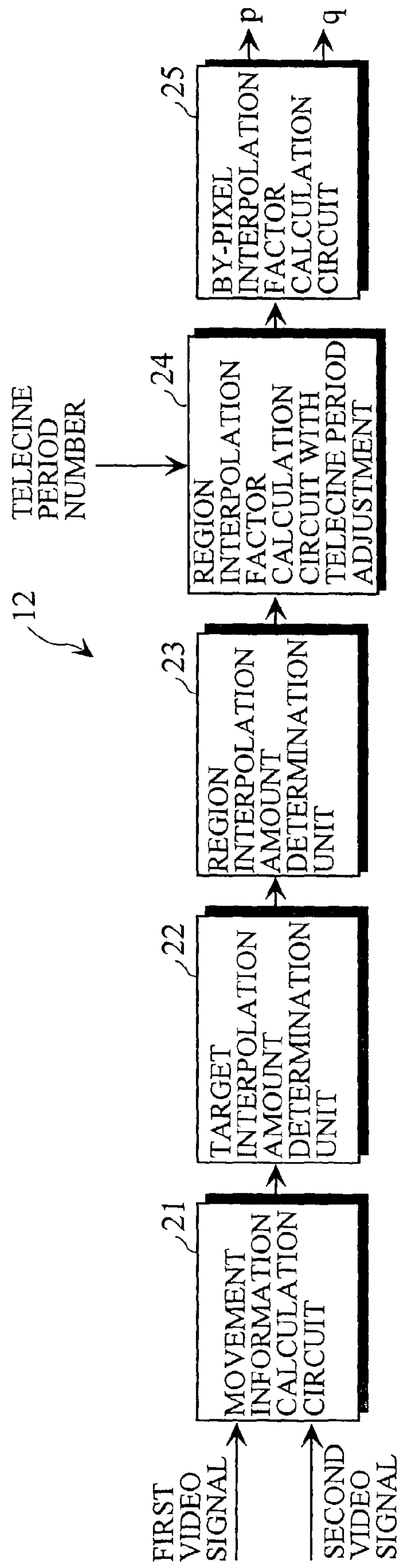
FIG. 5 is a block diagram showing the configuration of an interpolation factor control circuit 12.

FIG. 5 illustrates the configuration of the interpolation factor control circuit 12.

The interpolation factor control circuit 12 comprises a movement information calculation circuit 21, a target interpolation amount determination unit 22, a region interpolation amount determination unit 23, a region interpolation factor calculation circuit with telecine period adjustment 24, and a by-pixel interpolation factor calculation circuit 25.

The movement information calculation circuit 21 calculates information related to movement on the basis of a first video signal and a second video signal which are outputted from the selector 5.

The target interpolation amount determination unit 22 calculates a target interpolation factor on the basis of the information related to movement.

The region interpolation amount determination unit 23 calculates a new region interpolation factor on the basis of the target interpolation factor and the previous region interpolation factor.

The region interpolation factor calculation circuit with telecine period adjustment 24 determines the region interpolation factor on the basis of a telecine period number.

The by-pixel interpolation factor calculation circuit 25 calculates interpolation factors for each pixel on the basis of the region interpolation factor.

The units will be described below.

[3-1] Description of Movement Information Calculation Circuit 21

One screen area shall be divided into a plurality of blocks.

The movement information calculation circuit 21 calculates for each block information related to movement (hereinafter referred to as movement information) Det expressed by the following equation (1).

$$Det = Wa\cdot(\text{amount of change in edge}) + Wb\cdot(\text{amount of change in luminance}) + Wc\cdot(\text{amount of change in contrast}) \tag{1}$$

Wa, Wb, and Wc are weighting factors previously set. Description is made of a method of finding the amount of change in edge, the amount of change in luminance, and the amount of change in contrast.

Figures 6, 7:
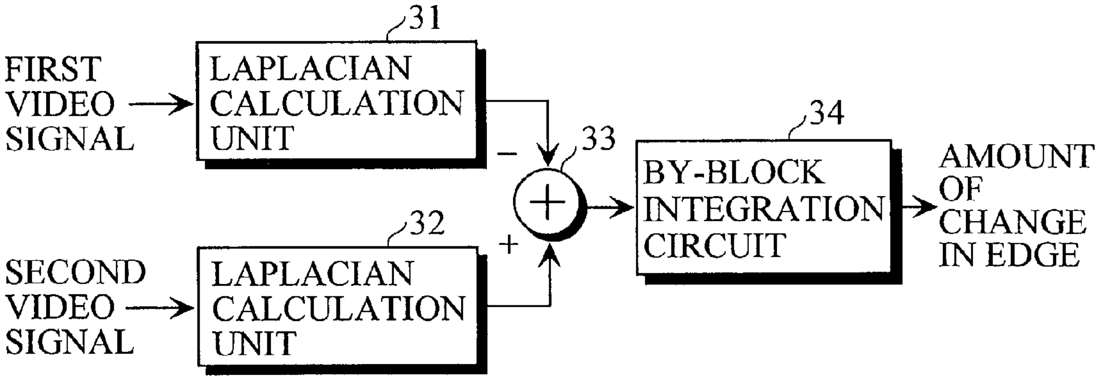
FIG. 6 is a circuit diagram showing a circuit for calculating the amount of change in edge.
FIG. 7 is a schematic view showing a filter for calculating a Laplacian.

FIG. 6 illustrates a circuit for calculating the amount of change in edge.

The first video signal is fed to a first Laplacian calculation unit 31. The first Laplacian calculation unit 31 finds a Laplacian for each pixel using a filter shown in FIG. 7. The second video signal is fed to a second Laplacian calculation unit 32. The second Laplacian calculation unit 32 finds a Laplacian for each pixel using the filter shown in FIG. 7.

An adder 33 calculates the difference between the Laplacians for the same pixel which are respectively found by the Laplacian calculation units 31 and 32. An output of the adder 33 is fed to a by-block integration circuit 34. The by-block integration circuit 34 integrates for each block outputs of the adder 33, and outputs the absolute value of an integration value for the block as the amount of change in edge in the block.

Figure 8:
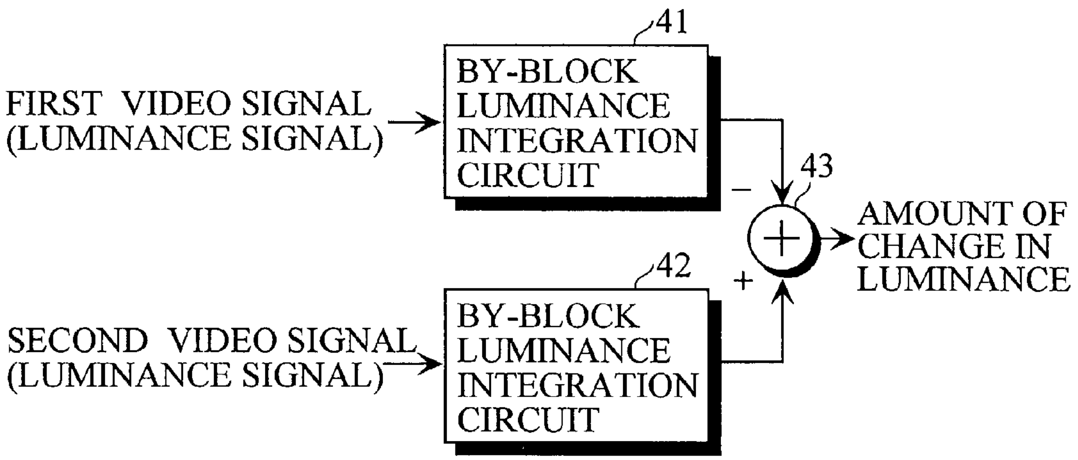
FIG. 8 is a circuit diagram showing a circuit for calculating the amount of change in luminance.

FIG. 8 illustrates a circuit for calculating the amount of change in luminance.

A luminance signal in the first video signal is fed to a first by-block luminance integration circuit 41. The first by-block luminance integration circuit 41 calculates for each block a luminance integration value. A luminance signal in the second video signal is fed to a second by-block luminance integration circuit 42. The second by-block luminance integration circuit 42 calculates for each block a luminance integration value.

The luminance integration value for each block calculated by the first by-block luminance integration circuit 41 and the luminance integration value for each block calculated by the second by-block luminance integration circuit 42 are fed to an adder 43. The adder 43 calculates the absolute value of the difference between both the luminance integration values for the same block, and outputs the calculated absolute value as the amount of change in luminance for the block.

Figure 9:
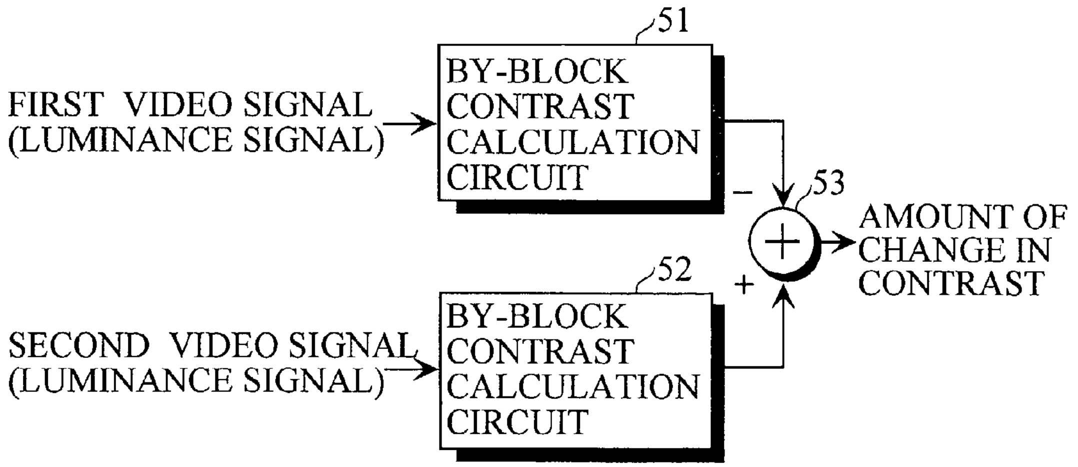
FIG. 9 is a circuit diagram showing a circuit for calculating the amount of change in contrast.

FIG. 9 illustrates a circuit for calculating the amount of change in contrast.

A luminance signal in the first video signal is fed to a first by-block contrast calculation circuit 51. The first by-block contrast calculation circuit 51 calculates for each block the difference (contrast) between the maximum luminance value and the minimum luminance value.

A luminance signal in the second video signal is fed to a second by-block contrast calculation circuit 52. The second by-block contrast calculation circuit 52 calculates for each block the difference (contrast) between the maximum luminance value and the minimum luminance value.

The contrast for each block calculated by the first by-block contrast calculation circuit 51 and the contrast for each block calculated by the second by-block contrast calculation circuit 52 are fed to an adder 53. The adder 53 calculates the absolute value of the difference (contrast) between the contrasts for the same block and outputs the calculated absolute value as the amount of change in contrast for the block.

[3-2] Description of Target Interpolation Amount Determination Unit 22

Figure 10:
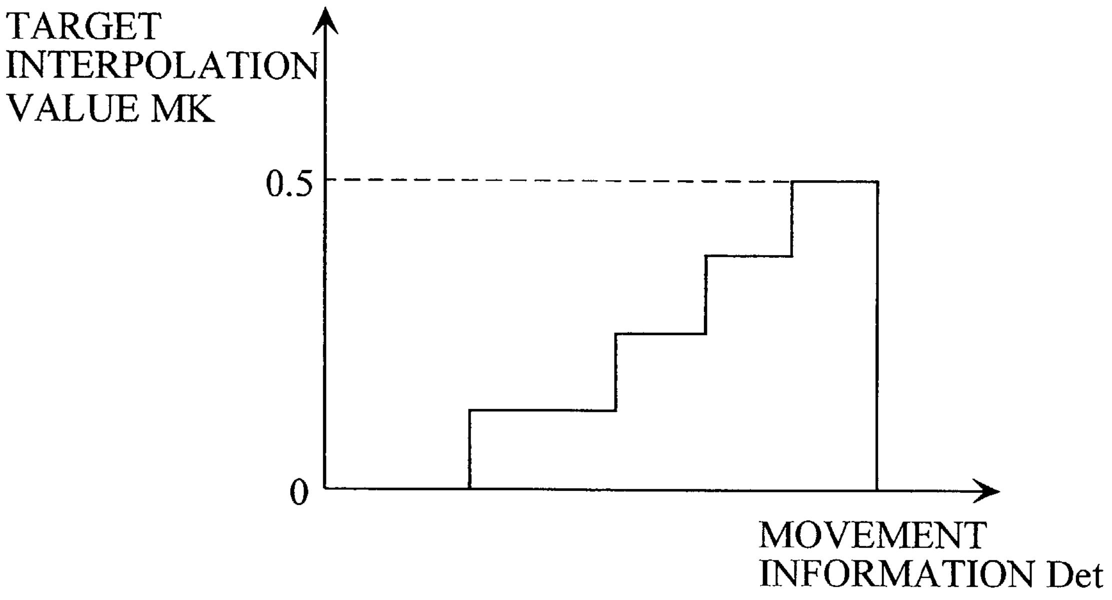
FIG. 10 is a graph showing the relationship between movement information Det and a target interpolation value MK.

The target interpolation amount determination unit 22 determines, on the basis of a table storing the relationship between movement information Det for each block and a target interpolation value MK corresponding to the movement information Det as shown in FIG. 10, the target interpolation value MK for the block.

[3-3] Description of Region Interpolation Amount Determination Unit 23

Figure 11:
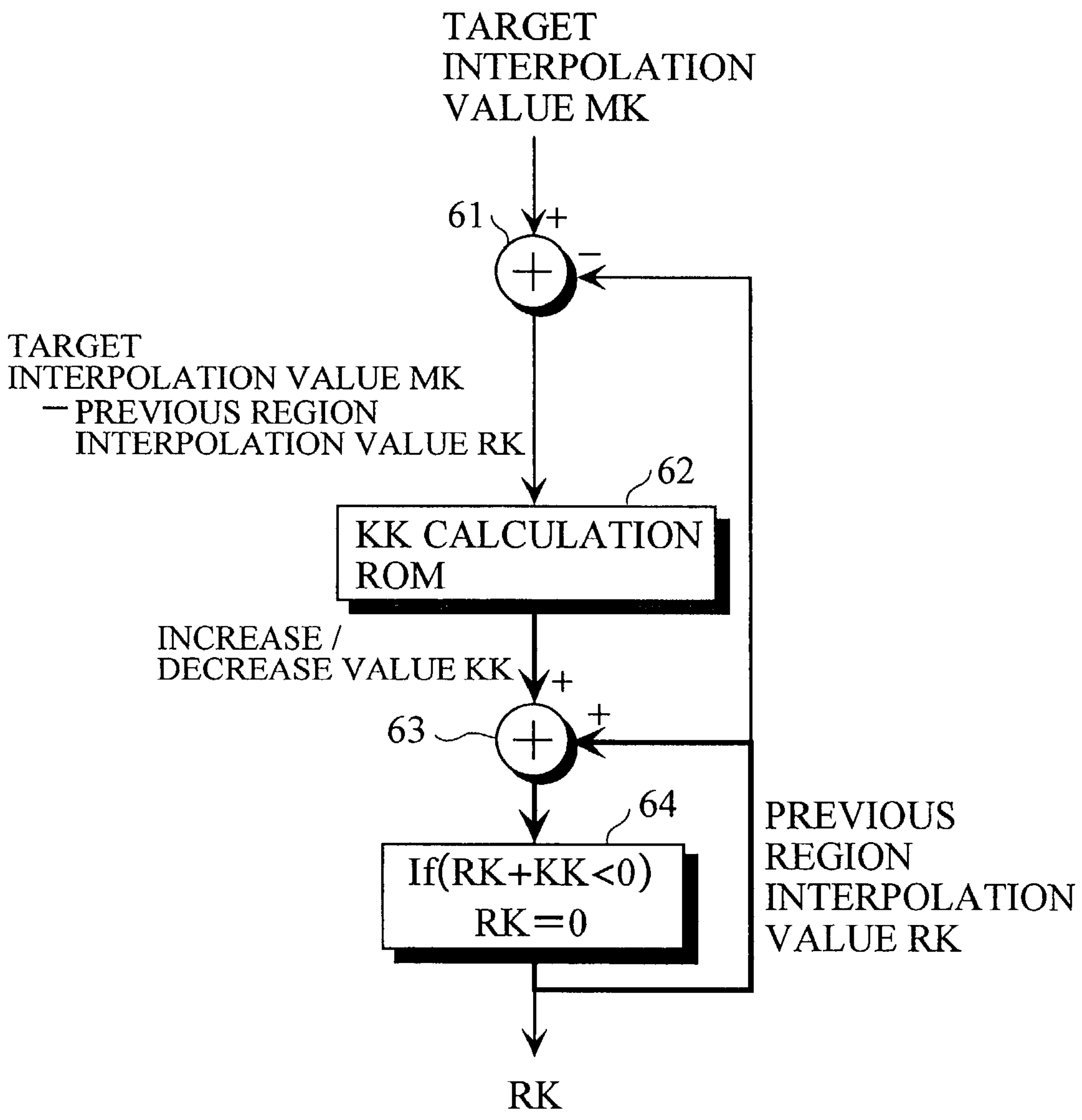
FIG. 11 is a circuit diagram showing the configuration of a region interpolation amount determination unit 23.

FIG. 11 illustrates the configuration of the region interpolation amount determination unit 23.

The region interpolation amount determination unit 23 calculates for each block a region interpolation value RK in the following manner.

First, the difference between the target interpolation value MK and the previous region interpolation value RK for the block is first calculated by a first adder 61.

Figure 12:
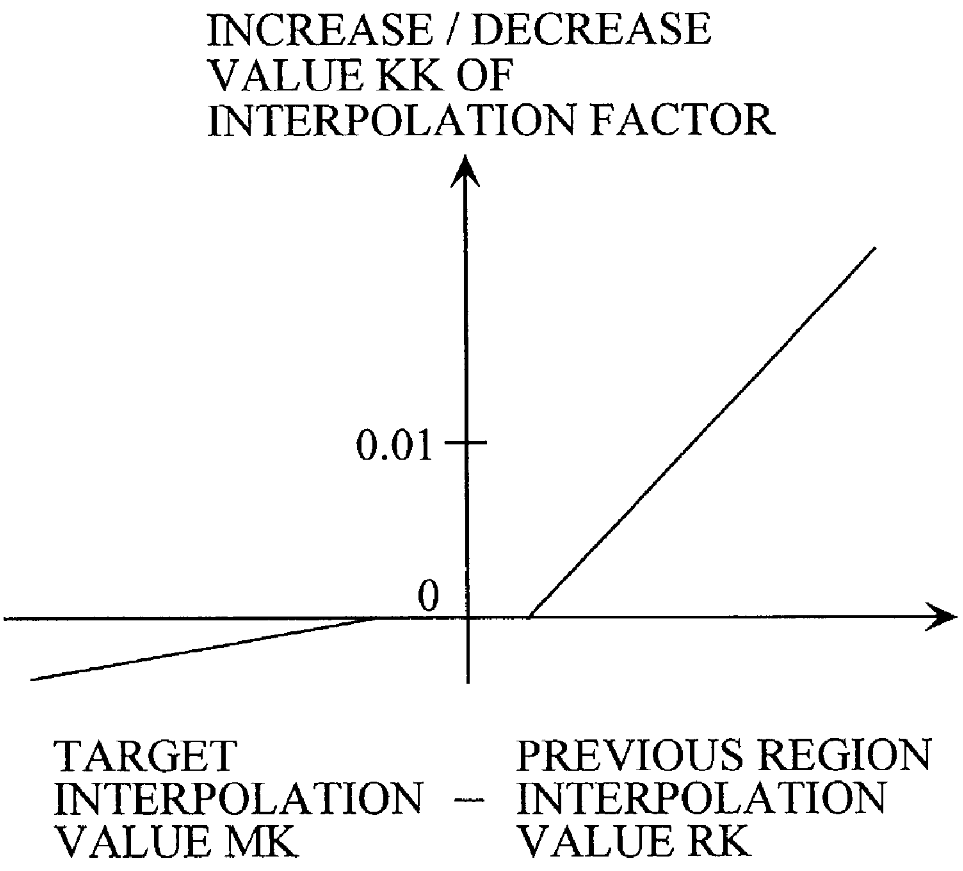
FIG. 12 is a graph showing the relationship of an increase/decrease value KK of an interpolation factor with (a target interpolation value MK—the previous region interpolation value RK)

An increase/decrease value KK of an interpolation factor is then calculated by a KK calculation ROM 62. The KK calculation ROM 62 finds KK on the basis of the relationship between a difference (MK−RK) calculated by the first adder 61 and a difference (the target interpolation value MK—the previous region interpolation value RK) as shown in FIG. 12.

A second adder 63 then adds the previous region interpolation value RK for the block to KK calculated by the KK calculation ROM 62.

The result of the addition (KK+RK) is sent to a comparison circuit 64. The comparison circuit 64 outputs, if the result of the addition (KK+RK) is not less than zero, the result of the addition (KK+RK) as the current region interpolation value RK, while outputting, if the result of the addition (KK+RK) is less than zero, zero as the current region interpolation value RK.

[3-4] Description of Region Interpolation Factor Calculation Circuit with Telecine Period Adjustment 24

The region interpolation factor calculation circuit with telecine period adjustment 24 produces for each block an interpolation factor α for each telecine period number and outputs the produced interpolation factor on the basis of a region interpolation value RK and a telecine period number for the block.

The interpolation factor α corresponding to a combination of RK and the telecine period number is determined on the basis of a table shown in FIG. 13. The interpolation factor α corresponding to the combination of RK and the telecine period number may be determined on the basis of a table shown in FIG. 14.

[3-5] Description of By-Pixel Interpolation Factor Calculation Circuit 25

The by-pixel interpolation factor calculation circuit 25 finds an interpolation factor p for each pixel on the basis of an interpolation factor α for each block in a screen.

Figure 15:
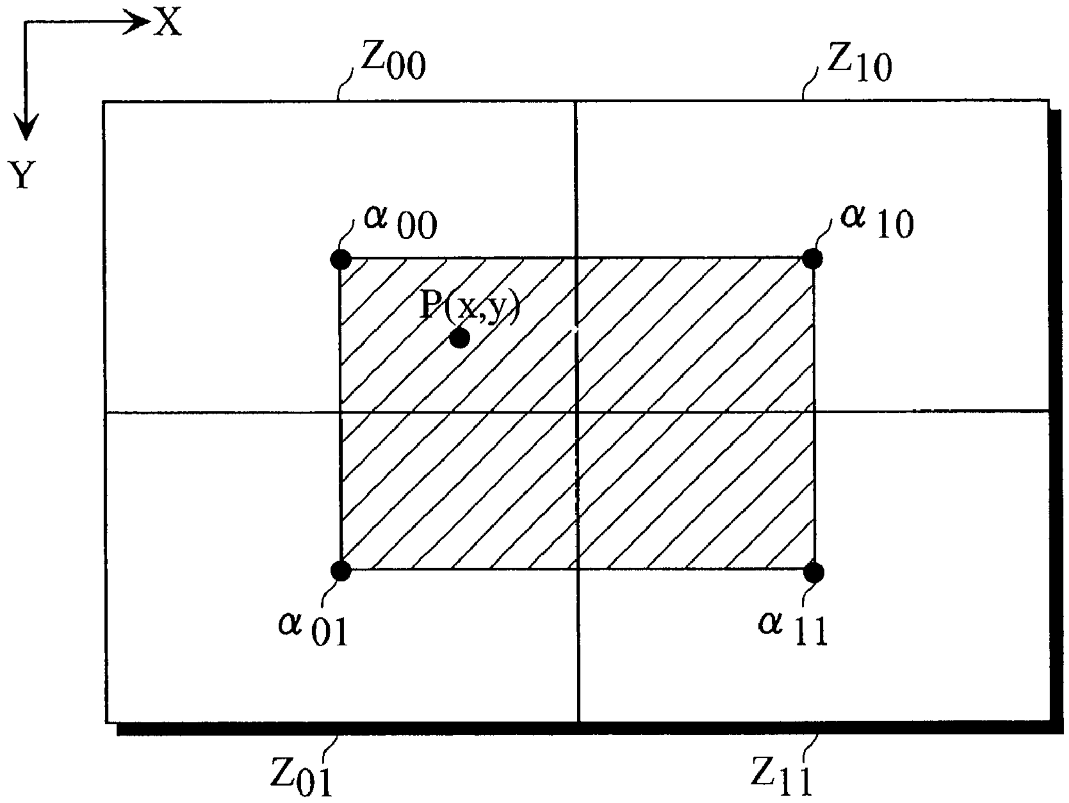
FIG. 15 is a schematic view for explaining a method of finding an interpolation factor for each pixel on the basis of an interpolation factor α for each block in a screen.

Description is made of a method of finding the interpolation factor p for each pixel using FIG. 15.

In FIG. 15, only four blocks $Z_{00}$, $Z_{10}$, $Z_{01}$, and $Z_{11}$ are illustrated for convenience of illustration. An interpolation factor calculated for the block $Z_{00}$ is taken as α00, an interpolation factor calculated for the block $Z_{10}$ is taken as α10, an interpolation factor calculated for the block $Z_{01}$ is taken as α01, and an interpolation factor calculated for the block $Z_{11}$ is taken as α11.

The coordinates at the center of the block $Z_{00}$ are taken as (x00, y00), the coordinates at the center of the block $Z_{10}$ are taken as (x10, y10), the coordinates at the center of the block $Z_{01}$ are taken as (x01, y01), and the coordinates at the center of the block $Z_{11}$ are taken as (x11, y11).

When interpolation factors for the pixel corresponding to the coordinates (x, y) are taken as p (x, y) and q (x, y), p (x, y) is calculated on the basis of the following equation (2). q (x, y) is found by 1−p (x, y).

$$p(x, y) = (\alpha 00 + \Delta h0 * (x - x00)) + [\{(\alpha 01 + \Delta h1 * (x - x0)) - (\alpha 00 + \Delta h0 * (x - x00))\} / (y01 - y00)] * (y - y00) \quad (2)$$

$$\Delta h0 = (\alpha 10 - \alpha 00) / (x10 - x00)$$

$$\Delta h1 = (\alpha 11 - \alpha 01) / (x11 - x01)$$

Figure 16:
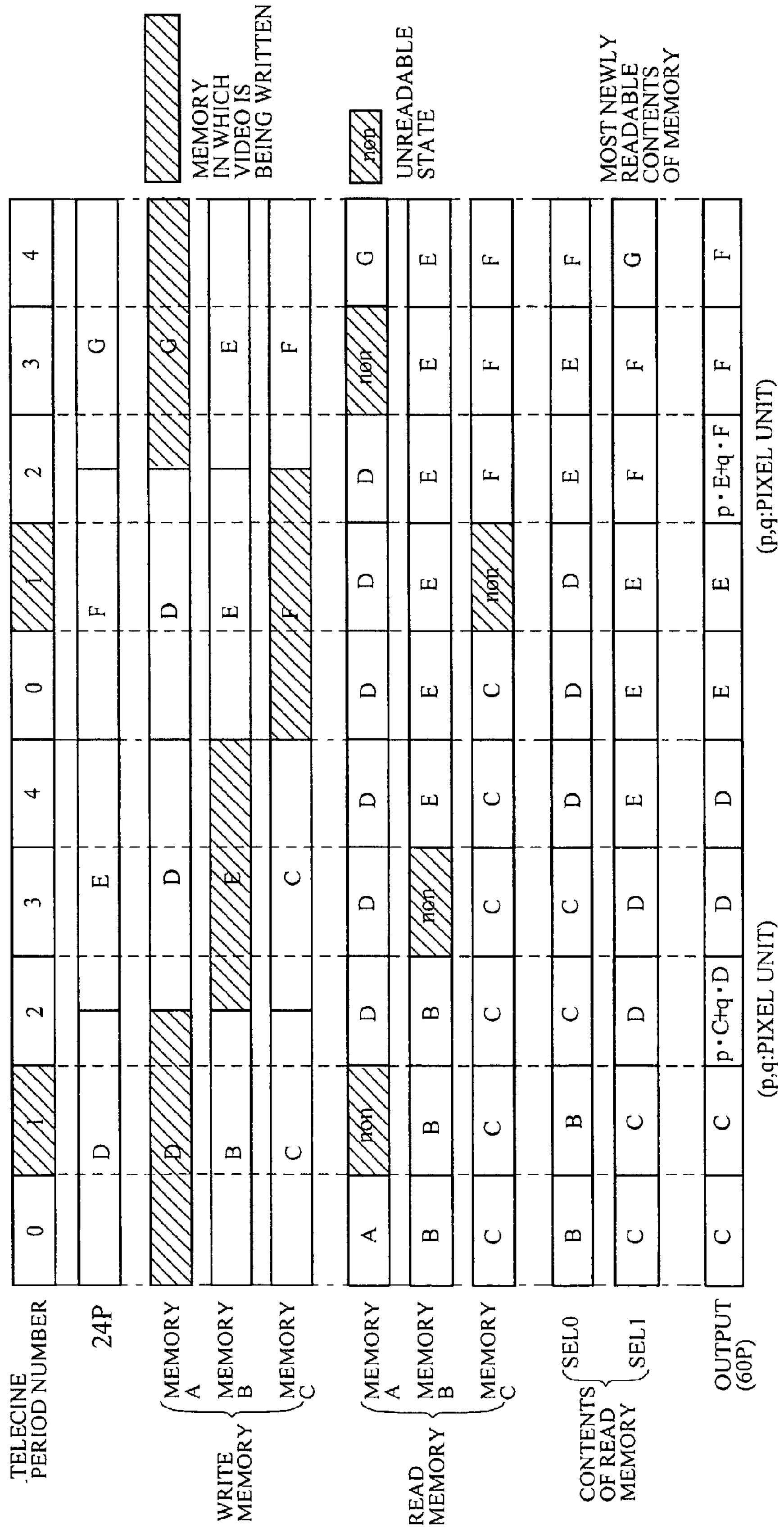
FIG. 16 is a timing chart showing respective signals in units shown in FIG. 4.

An example of respective signals or the like in units shown in FIG. 4 is illustrated in FIG. 16.

In FIG. 16, an output composed of 60 frames per second indicates a case where the region interpolation factor calculation circuit with telecine period adjustment 24 determines the interpolation factor α on the basis of the table shown in FIG. 13.

[C] Description of Third Embodiment

According to the first or second embodiment, the movement of a video becomes smoother than that in the conventional 2-3 pull-down system. When the video after telecine conversion is displayed on a CRT (Cathode-Ray Tube), it has become clear that flicker, that is, a phenomenon that a video seems to be flickering by the variation in the luminance level occurs depending on the type of the video.

The reason why the flicker occurs is conceivably that interpolation factors p and q the sum of which is one are used, so that the luminance level varies between a video obtained by interpolation and a video which is not interpolated. This will be more specifically described.

Figure 17:
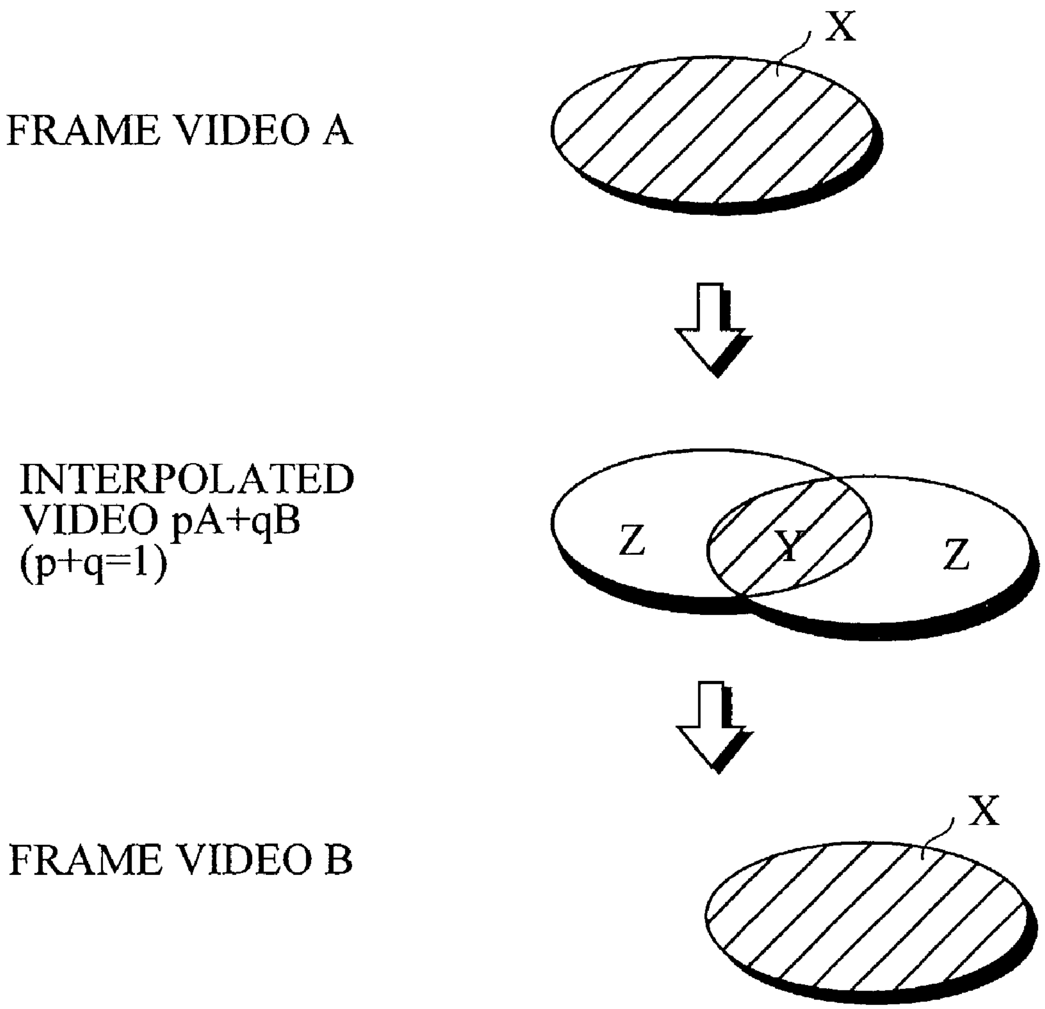
FIG. 17 is an illustration for explaining the reason why flicker occurs when telecine conversion is made by the first embodiment or a second embodiment.

As shown in FIG. 17, a moving object (an oblique portion) X having a high luminance shall exist between a frame video A and a frame video B. The frame video A and the second frame video B are interpolated using two interpolation factors p and q the sum of which is one, thereby obtaining an interpolated video (pA+qB) as shown in FIG. 17. In the interpolated video (pA+qB), the luminance is high in a portion (an oblique portion) Y where the moving object in the frame video A and the moving object in the frame video B are overlapped with each other, while being reduced in a portion Z where they are not overlapped with each other. That is, in the interpolated video (pA+qB), the area of the high-luminance portion of the moving object having a high luminance decreases. As a result, the luminance level varies between the interpolated video (pA+qB) and the videos A and B which are not interpolated.

[1] Description of Telecine Converting Method

Description is made of a telecine converting method for converting a movie film composed of 24 frames per second (24P) into a progressive video signal composed of 60 frames per second (60P) using linear interpolation in the whole of a screen.

FIGS. 18(*b*), 18(*c*), and 18(*d*) respectively illustrate three specific telecine converting methods using the linear interpolation in the whole screen. FIG. 18(*a*) illustrates a conventional 2-3 pull-down system.

[1-1] Description of First Method Shown in FIG. 18(*b*)

The first method uses, in a portion where videos are switched, as in switching from a video A to a video B (a video before switching is taken as $Q_n$, and the subsequent video is taken as $Q_{n+1}$) in the 2-3 pull-down system, not the subsequent video $Q_{n+1}$ as it is but an interpolated video ($pQ_n+qQ_{n+1}$) obtained by interpolating the videos $Q_n$ and $Q_{n+1}$ before and after the switching.

In order to compensate for the decrease in the luminance of the interpolated video to make it difficult to make flicker conspicuous, interpolation factors p and q are determined such that the sum (p+q) is larger than one.

When the sum of the interpolation factors p and q is thus determined to be a value larger than one, an obtained interpolation value ($pQ_n+qQ_{n+1}$) for each pixel may, in some cases, exceed the luminance value of the larger one of the two original frame videos $Q_n$ and $Q_{n+1}$ used for calculating the interpolation value. When such a phenomenon occurs, the luminance of the interpolated video is too large, so that reversed flicker may occur.

In the present embodiment, when the obtained interpolation value ($pQ_n+qQ_{n+1}$) for each pixel exceeds the luminance value of the larger one of the two original frame videos $Q_n$ and $Q_{n+1}$ used for calculating the interpolation value, as described later, the interpolation value is corrected so as to be not more than the luminance value of the larger one of the two original frame videos $Q_n$ and $Q_{n+1}$. Such correction is similarly made in the second method and the third method.

In the first method, when the same video is continued for two frames and is then switched in the 2-3 pull-down system, as in the switching between the videos A and B in the 2-3 pull-down system, p=24/32 and q=9/32. On the other hand, when the same video is continued for three frames and is then switched in the 2-3 pull-down system, as in switching between videos B and C in the 2-3 pull-down system, p=8/32 and q=25/32.

Furthermore, in this example, the interpolation factors p and q are determined such that respective integration values of display time periods of frame videos in the movie film become equal. Consequently, the display time period of each of the frame videos is a time period corresponding to {2+(17/32)} frames. Although in this example, the interpolation factors p and q are determined such that the integration values of the respective display time periods of the frame videos become equal, the integration values of the respective display time periods of the frame videos need not be equal.

[1-2] Description of Second Method Shown in FIG. 18(*c*)

In the first method shown in FIG. 18(*b*), described above, in the portion where the same video, for example, the video B or D is continued for three frames in the 2-3 pull-down system, the video in the head frame is an interpolated video, and the videos in the two frames subsequent to the head frame are the same video.

Consider a case where the video includes fast movement. In this case, in a portion where the same video is continued for two frames, there occurs a state where the video stands still for two frames, so that “backlash” is produced in the movement of the video.

The second method replaces one of portions where the same video is continued with an interpolated video in addition to replacing a portion where videos are switched with an interpolated video in the 2-3 pull-down system.

Interpolation factors p and q are determined such that the sum thereof is larger than one and respective integration values of display time periods of frame videos in the movie film become equal, as shown in FIG. 18(*c*).

[1-3] Description of Third Method Shown in FIG. 18(*d*)

In the third method, a frame video (A, C, etc.) appears at a rate of once per five frames, videos in all frames between the frame videos are interpolated videos (e.g., pA+qB). Interpolated factors p and q of each of the interpolated videos are determined such that the sum thereof is larger than one and respective integration values of display time periods of frame videos in the movie film become equal, as shown in FIG. 18(*d*).

[2] Description of Telecine Converter

Figure 19:
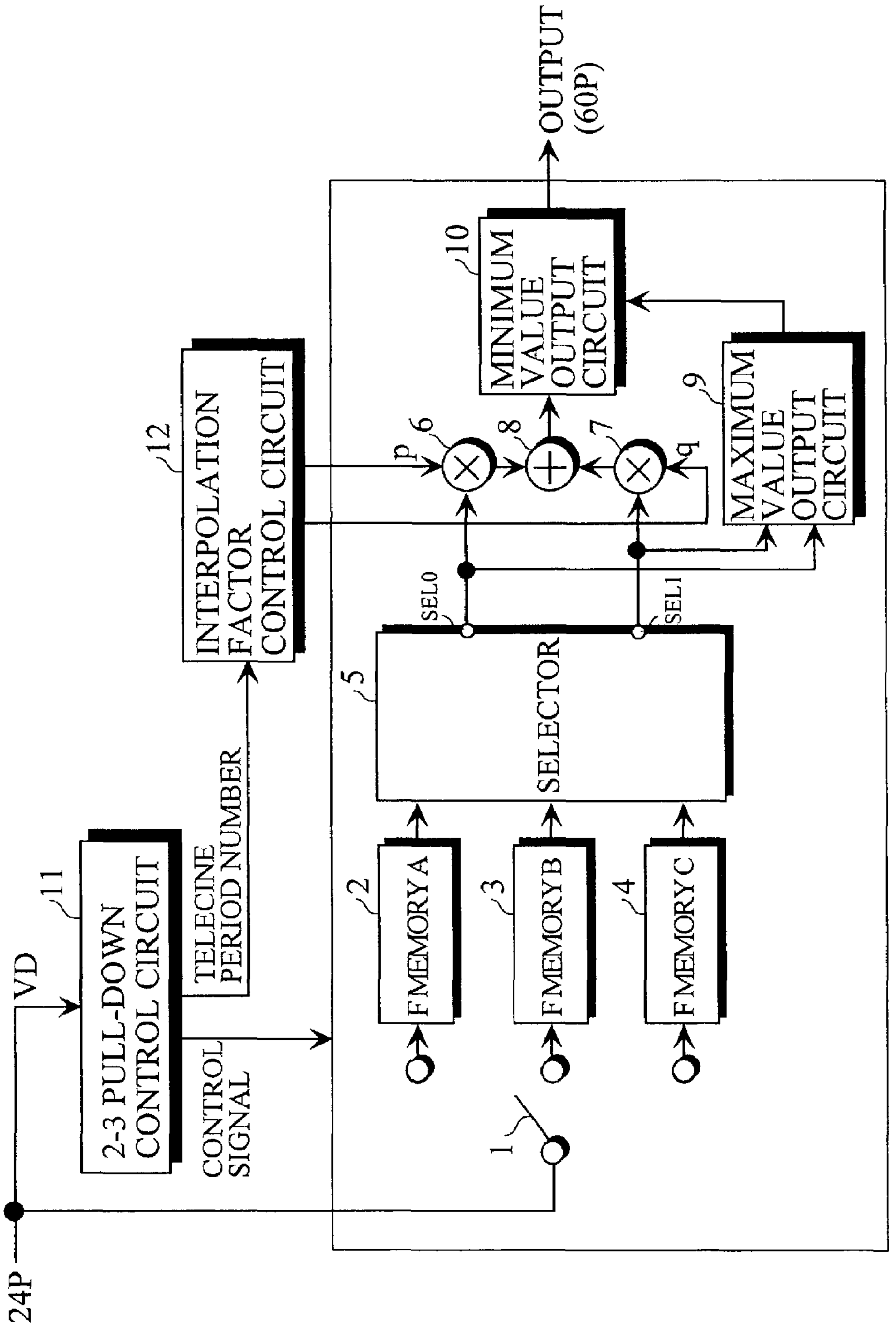
FIG. 19 is a block diagram showing the configuration of a telecine converter for realizing the telecine converting method according to the third embodiment.

FIG. 19 illustrates the configuration of a telecine converter for realizing the above-mentioned first, second or third method.

An input video composed of 24 frames per second (a video in a movie film) is sent to any of frame memories 2, 3, and 4 through a switch 1. The video read out of each of the frame memories 2, 3, and 4 is sent to a selector 5.

Respective video signals read out of the two frame memories are generally inputted to the selector 5, as described later. The selector 5 outputs one of the inputted two video signals from an output terminal (SELO) as a first video signal, while outputting the other video signal from an output terminal (SEL1) as a second video signal.

The first video signal outputted from the output terminal (SELO) of the selector 5 is fed to a first multiplier 6, and the second video signal outputted from the output terminal (SEL1) of the selector 5 is fed to a second multiplier 7. The first multiplier 6 multiplies the first video signal by an interpolation factor p. The second multiplier 7 multiplies the second video signal by an interpolation factor q.

An output of the first multiplier 6 and an output of the second multiplier 7 are added together by an adder 8. An output of the adder 8 is fed to a minimum value output circuit 10.

The first video signal outputted from the output terminal (SEL0) of the selector 5 and the second video signal outputted from the output terminal (SEL1) of the selector 5 are also fed to a maximum value output circuit 9. The maximum value output circuit 9 outputs, out of the first video signal and the second video signal, the video signal having the larger luminance value. An output of the maximum value output circuit 9 is fed to the minimum value output circuit 10.

The minimum value output circuit 10 outputs, out of the video signal fed from the adder 8 and the video signal fed from the maximum value output circuit 9, the video signal having the smaller luminance value. An output signal of the minimum value output circuit 10 is outputted as a video signal composed of 60 frames per second.

The maximum value output circuit 9 and the minimum value output circuit 10 are provided in order to make correction, when an interpolation value for each pixel obtained using the interpolation factors p and q exceeds the larger one of the luminance values of the two original frame videos used for calculating the interpolation value, such that the interpolation value is not more than the larger one of the luminance values of the two original frame videos.

The switch 1, the frame memories 2, 3, and 4, and the selector 5 are controlled by a 2-3 pull-down control circuit 11 to which a vertical synchronizing signal VD in the input video is inputted. The interpolation factors p and q are created by an interpolation factor control circuit 12. The interpolation factor control circuit 12 creates the interpolation factors p and q on the basis of a telecine period number sent from the 2-3 pull-down control circuit 11.

FIG. 20 illustrates respective signals in the units shown in FIG. 19.

In FIG. 20, telecine period numbers are of five types “0” to “4” for each frame, and “0” to “4” are repeated.

The switch 1 is switched so as to cyclically select the three frame memories (the memory A, the memory B, and the memory C) 2, 3, and 4 in synchronization with the timing of switching an input video.

Out of videos stored in the frame memories 2, 3, and 4, the video which is most newly readable and the video which is readable previous to the most newly readable video are read out and are sent to the selector 5. The most newly readable video is outputted as the second video from the terminal (SEL1) of the selector 5. The video which is readable previous to the most newly readable video is outputted as the first video from the terminal (SEL0) of the selector 5.

Interpolation factors are determined in the following manner on the basis of the telecine period number.

(1) Case of first method

| | |
|---|---|
| telecine period number "0" | p = 0, q = 1 |
| telecine period number "1" | p = 0, q = 1 |
| telecine period number "2" | p = 8/32, q = 25/32 |
| telecine period number "3" | p = 0, q = 1 |
| telecine period number "4" | p = 24/32, q = 9/32 |

(2) Case of second method

| | |
|---|---|
| telecine period number "0" | p = 33/64, q = 33/64 |
| telecine period number "1" | p = 0, q = 1 |

-continued

| | |
|---|---|
| telecine period number "2" | p = 25/32, q = 8/32 |
| telecine period number "3" | p = 8/32, q = 25/32 |
| telecine period number "4" | p = 1, q = 0 |
| (3) Case of third method | |
| telecine period number "0" | p = 33/64, q = 33/64 |
| telecine period number "1" | p = 8/32, q = 25/32 |
| telecine period number "2" | p = 24/32, q = 9/32 |
| telecine period number "3" | p = 33/64, q = 33/64 |
| telecine period number "4" | p = 1, q = 0 |

[D] Description of Fourth Embodiment

In the fourth embodiment, interpolation factors are adaptively controlled depending on the area of a movement region. For example, an interpolated video is produced using factors p and q the sum of which is one when the area of the movement region is small, while being produced using factors p and q the sum of which is larger than one when the area of the movement region is large.

Figure 21:
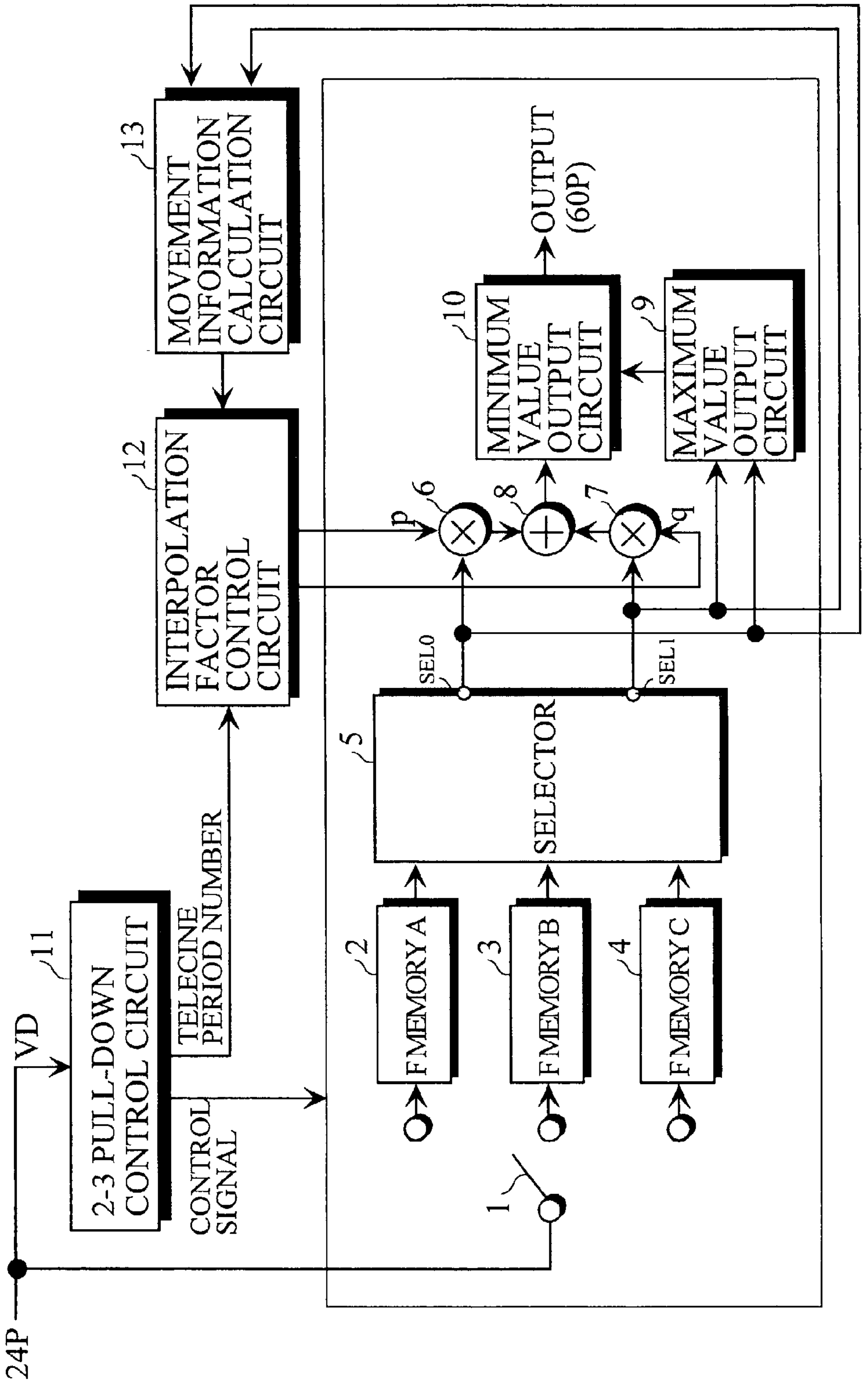
FIG. 21 is a block diagram showing the configuration of a telecine converter for realizing a telecine converting method according to a fourth embodiment.

FIG. 21 illustrates the configuration of a telecine converter.

In FIG. 21, units corresponding to those shown in FIG. 19 are assigned the same reference numerals as those shown in FIG. 19.

The telecine converter shown in FIG. 21 differs from the telecine converter shown in FIG. 19 in that a movement information calculation circuit 13 is provided, and an interpolation factor control circuit 12 is switched between factors p and q the sum of which is one and factors p and q the sum of which is larger than one depending on the area of a movement region calculated by the movement information calculation circuit 13.

The interpolation factor control circuit 12 comprises two types of factor tables as shown in FIGS. 22*a* and 22*b*, for example. The first factor table shown in FIG. 22*a* stores the values of factors p and q corresponding to a telecine period number in a case where the area of the movement region is small. The second factor table shown in FIG. 22*b* stores the values of factors p and q corresponding to a telecine period number in a case where the area of the movement region is large.

The values of the factors p and q corresponding to the telecine period number in the case where the area of the movement region is small are set to values the sum of which is one. The values of the factors p and q corresponding to the telecine period number in the case where the area of the movement region is large are set to values the sum of which is larger than one.

Figure 23:
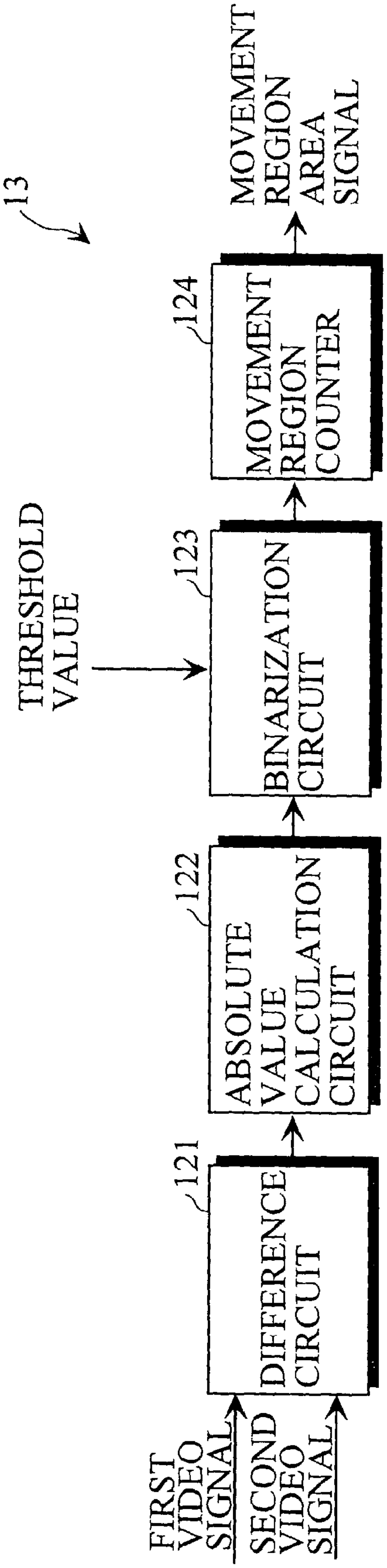
FIG. 23 is a block diagram showing the configuration of a movement information calculation circuit.

FIG. 23 illustrates the configuration of the movement information calculation circuit 13.

A first video signal and a second video signal which are outputted from the selector 5 are inputted to the movement information calculation circuit 13.

The movement information calculation circuit 13 comprises a difference circuit 121, an absolute value calculation circuit 122, a binarization circuit 123, and a movement region counter 124.

The difference circuit 121 calculates the difference in luminance for each pixel between the first video signal and the second video signal. The absolute value calculation circuit 122 calculates the absolute value of the difference in luminance for each pixel obtained by the difference circuit 121.

The binarization circuit 123 binarizes the absolute value of the difference in luminance for each pixel on the basis of a predetermined threshold value. That is, the binarization circuit 123 judges whether the pixel is a pixel which moves or a pixel which does not move. When the absolute value of the difference in luminance is larger than the threshold value, it is judged that the pixel is a pixel which moves. The movement region counter 124 counts for each field the number of pixels which are judged to move. The number of pixels, which move, counted by the movement region counter 124, that is, the area of a movement region is fed to the interpolation factor control circuit 12.

The interpolation factor control circuit 12 determines, when the area of the movement region for the preceding field is not more than the predetermined threshold value, the factors p and q on the basis of the first factor table and the telecine period number shown in FIG. 22*a*, and respectively feeds the factors p and q to the corresponding multipliers 6 and 7.

The interpolation factor control circuit 12 determines, when the area of the movement region for the preceding field is more than the predetermined threshold value, the factors p and q on the basis of the second factor table and the telecine period number shown in FIG. 22*b*, and respectively feeds the factors p and q to the corresponding multipliers 6 and 7.

[E] Description of Modified Example of Fourth Embodiment

Although in the above-mentioned fourth embodiment, the factors are adaptively controlled depending on the area of the movement region, the factors may be adaptively controlled depending on the amount of change in luminance of the movement region (the difference in the luminance level of the movement region).

That is, employed as the movement information calculation circuit 13 shown in FIG. 21 is one for calculating the amount of change in luminance of the movement region.

Figure 24:
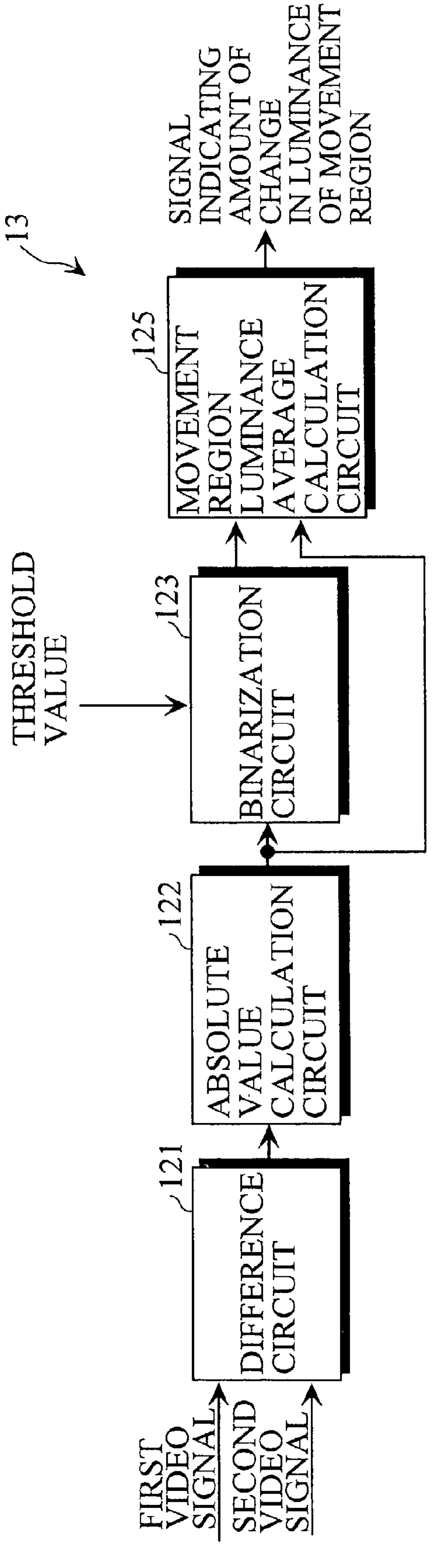
FIG. 24 is a block diagram showing another example of the configuration of the movement information calculation circuit.

FIG. 24 illustrates the configuration of the movement information calculation circuit 13 for calculating the amount of change in luminance of the movement region.

The movement information calculation circuit 13 comprises a difference circuit 121, an absolute value calculation circuit 122, a binarization circuit 123, and a movement region luminance average calculation circuit 125.

The difference circuit 121 calculates the difference in luminance for each pixel between a first video signal and a second video signal. The absolute value calculation circuit 122 calculates the absolute value of the difference in luminance for each pixel obtained by the difference circuit 121. The binarization circuit 123 binarizes the absolute value of the difference in luminance for each pixel on the basis of a predetermined threshold value. That is, the binarization circuit 123 judges whether the pixel is a pixel which moves or a pixel which does not move. When the absolute value of the difference in luminance is larger than the threshold value, it is judged that the pixel is a pixel which moves.

To the movement region luminance average calculation circuit 125, an output of the absolute value calculation circuit 122 (the absolute value of the difference in luminance for each pixel) and an output of the binarization circuit 123 (a movement presence/absence judgment-signal) are inputted. The movement region luminance average calculation circuit 125 finds for each field the total sum of the absolute values of the differences in luminance between the pixels which are judged to move, and divides the found total sum by the number of pixels which are judged to move, to calculate the amount of the change (the average value) in luminance of the movement region. The amount of change (the average value) in luminance of the movement region calculated by the movement region luminance average calculation circuit 125 is sent to the interpolation factor control circuit 12.

The interpolation factor control circuit 12 comprises two types of factor tables as shown in FIGS. 22*a* and 22*b*, for example. The first factor table shown in FIG. 22*a* stores the values of factors p and q corresponding to a telecine period number in a case where the difference in the luminance level of the movement region is small. The second factor table shown in FIG. 22*b* stores the values of factors p and q corresponding to a telecine period number in a case where the difference in the luminance level of the movement region is large.

The interpolation factor control circuit 12 determines, when the amount of change in luminance of the movement region corresponding to the preceding field is not more than a predetermined threshold value, the factors p and q on the basis of the first factor table and the telecine period number shown in FIG. 22*a*, and respectively feeds the factors p and q to the corresponding multipliers 6 and 7.

The interpolation factor control circuit 12 determines, when the amount of change in luminance of the movement region corresponding to the preceding field is more than the predetermined threshold value, the factors p and q on the basis of the second factor table and the telecine period number shown in FIG. 22*b*, and respectively feeds the factors p and q to the corresponding multipliers 6 and 7.

Used as the movement information calculation circuit 13 may be one for calculating both the area of the movement region and the difference in the luminance level of the movement region, to use factors p and q the sum of which is larger than one in a case where the area of the movement region is large and the amount of change in luminance of the movement region is large, while using factors p and q the sum of which is one in a case where the area of the movement region is small or the movement of change in luminance of the movement region is small.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a telecine converting method for converting a video in a movie film composed of 24 frames per second into a video signal composed of 60 frames per second, a telecine converting method characterized in that in order that respective integration values of display time periods of frame videos in the movie film become equal after the telecine conversion, a video in the predetermined frame after the conversion is an interpolated video obtained by interpolating the frame videos ahead of and behind the video in the movie film.

2. In a telecine converting method for converting a video in a movie film composed of 24 frames per second into a video signal composed of 60 frames per second, which is so adapted as to use as a video in the predetermined frame after the telecine conversion an interpolated video obtained by interpolating frame videos ahead of and behind the video in the movie film, a telecine converting method characterized by dividing one screen into a plurality of blocks, calculating, for each of the blocks, information related to the movement of the block, determining, when the interpolated video is produced, an interpolation factor for each of the blocks on the basis of the information related to the movement of the block, and producing the interpolated video for each of the blocks on the basis of the determined interpolation factor for the block.

3. The telecine converting method according to claim 2, characterized by calculating an interpolation factor for each pixel on the basis of the interpolation factor determined for each block, and producing, on the basis of the calculated interpolation factor for each pixel, an interpolated video for the pixel.

4. In a telecine converting method for converting a video in a movie film composed of 24 frames per second into a video signal composed of 60 frames per second, which is so adapted as to use as a video in the predetermined frame after the telecine conversion an interpolated video obtained by interpolating frame videos ahead of and behind the video in the movie film, a telecine converting method characterized by using, as interpolation factors by which the frame videos ahead of and behind the predetermined frame video are respectively multiplied, interpolation factors the sum of which is larger than one, and correcting, when an obtained interpolation value for each pixel exceeds the larger one of the luminance values of the two original frame videos used for calculating the interpolation value, the interpolation value to be not more than the larger one of the luminance values of the two original frame videos.

5. In a telecine converting method for converting a video in a movie film composed of 24 frames per second into a video signal composed of 60 frames per second, which is so adapted as to use as a video in the predetermined frame after the telecine conversion an interpolated video obtained by interpolating frame videos ahead of and behind the video in the movie film, a telecine converting method characterized by preparing, as interpolation factors by which the frame videos ahead of and behind the video in the movie film are respectively multiplied, interpolation factors the sum of which is one and interpolation factors the sum of which is larger than one, producing, when the area of a movement region is not more than a predetermined value, the interpolated video using the interpolation factors the sum of which is one, producing, when the area of the movement region is more than the predetermined value, the interpolated video using the interpolation factors the sum of which is larger than one, and correcting, when in a case where the interpolated video is produced using the interpolation factors the sum of which is larger than one, an obtained interpolation value for each pixel exceeds the larger one of the luminance values of the two original frame videos used for calculating the interpolation value, the interpolation value to be not more than the larger one of the luminance values of the two original frame videos.

6. In a telecine converting method for converting a video in a movie film composed of 24 frames per second into a video signal composed of 60 frames per second, which is so adapted as to use as a video in the predetermined frame after the telecine conversion an interpolated video obtained by interpolating frame videos ahead of and behind the video in the movie film, a telecine converting method characterized by preparing, as interpolation factors by which the frame videos ahead of and behind the video in the movie film are respectively multiplied, interpolation factors the sum of which is one and interpolation factors the sum of which is larger than one, producing, when the amount of change in the luminance level of a movement region is not more than a predetermined value, the interpolated video using the interpolation factors the sum of which is one, producing, when the amount of change in the luminance level of the movement region is more than the predetermined value, the interpolated video using the interpolation factors the sum of which is larger than one, and correcting, when in a case where the interpolated video is produced using the interpolation factors the sum of which is larger than one, an obtained interpolation value for each pixel exceeds the larger one of the luminance values of the two original frame videos used for calculating the interpolation value, the interpolation value to be not more than the larger one of the luminance values of the two original frame videos.

7. The telecine converting method according to claim 1, wherein the frame videos ahead of and behind the video are multiplied by interpolation factors.

8. The telecine converting method according to claim 7, wherein the sum of the interpolation factors is equal to one.

9. The telecine converting method according to claim 7, wherein the sum of the interpolation factors is larger than one.

* * * * *